(12) United States Patent
Mege et al.

(10) Patent No.: US 9,166,829 B2
(45) Date of Patent: Oct. 20, 2015

(54) METHOD FOR ESTIMATING A RADIO CHANNEL

(71) Applicants: CASSIDIAN SAS, Elancourt (FR); CNAM-CONSERVATOIRE NATIONAL DES ARTS ET MÉTIERS, Paris (FR)

(72) Inventors: Philippe Mege, Bourg la Reine (FR); Laurent Martinod, Le Chesney (FR); Luc Fety, Paris (FR); Olivier Perrin, Saint-Aubin-d'Écrosville (FR)

(73) Assignees: CASSIDIAN SAS, Elancourt (FR); CNAM—CONSERVATOIRE NATIONAL DES ARTS ET MÉTIERS, Paris (FR)

( * ) Notice: Subject to any disclaimer, the term of this patent is extended or adjusted under 35 U.S.C. 154(b) by 0 days.

(21) Appl. No.: 14/362,191

(22) PCT Filed: Nov. 28, 2012

(86) PCT No.: PCT/EP2012/004912
§ 371 (c)(1),
(2) Date: Jun. 2, 2014

(87) PCT Pub. No.: WO2013/079192
PCT Pub. Date: Jun. 6, 2013

(65) Prior Publication Data
US 2014/0334569 A1   Nov. 13, 2014

(30) Foreign Application Priority Data
Dec. 1, 2011   (FR) ..................... 11 61061

(51) Int. Cl.
*H03D 1/04*   (2006.01)
*H03D 1/06*   (2006.01)
(Continued)

(52) U.S. Cl.
CPC .......... *H04L 25/021* (2013.01); *H04L 25/0202* (2013.01); *H04L 25/023* (2013.01);
(Continued)

(58) Field of Classification Search
CPC . H04L 25/021; H04L 25/023; H04L 25/0248; H04L 25/0202; H04L 25/0224; H04L 25/0256; H04L 27/2647; H04B 7/0626; H04B 7/0632; H04B 7/0663; H04B 7/0413; H04B 7/0619
USPC .......... 375/260, 267, 346, 347, 285; 455/101, 455/500, 501, 504, 63.1
See application file for complete search history.

(56) References Cited

U.S. PATENT DOCUMENTS 8,036,601 B2 * 10/2011 Prasad et al. ................. 455/63.1
2003/0016645 A1   1/2003 Siala et al.
(Continued)

OTHER PUBLICATIONS

International Search Report for Int. App. No. PCT/EP2012/004912, completed Feb. 11, 2013.

*Primary Examiner* — Phuong Phu
(74) *Attorney, Agent, or Firm* — Pillsbury Winthrop Shaw Pittman LLP

(57) ABSTRACT

This method for the estimation of a channel between an emitter and a receiver, where the said emitter emits a signal comprising symbol frames distributed in time and frequency, among which pilot symbols known to the receiver, is characterized in that it comprises the following steps: •—computation (30) of a covariance matrix $M_F$ and $M_T$ of the channel in the frequency and time domains respectively; •—decomposition (32) of the covariance matrices $M_F$ and $M_T$ into eigenvectors according to the relations $M_F = W_F^H N_F W_F$ and $M_T = W_T^H N_T W_T$; •—computation (34) of the Kronecker product of the matrices $NV_F$ and $W_T$ to obtain an eigenvector matrix W; •—computation (34) of a diagonal eigenvalue matrix $_N$ equal to the Kronecker product of the eigenvalue matrices $N_F$ and $N_T$; and •—estimation of the channel with the help of pilot symbols and matrices W and N using the maximum a posteriori or quadratic error minimisation criterion.

11 Claims, 2 Drawing Sheets

(51) Int. Cl.
*H03K 5/01* (2006.01)
*H03K 6/04* (2006.01)
*H04B 1/10* (2006.01)
*H04L 1/00* (2006.01)
*H04L 25/08* (2006.01)
*H04L 25/02* (2006.01)
*H04L 27/26* (2006.01)

(52) U.S. Cl.
CPC ........ *H04L25/0224* (2013.01); *H04L 25/0248* (2013.01); *H04L 25/0256* (2013.01); *H04L 27/2647* (2013.01)

(56) References Cited

U.S. PATENT DOCUMENTS

| | | | |
|---|---|---|---|
| 2006/0017613 A1* | 1/2006 | Son et al. | 342/375 |
| 2007/0058746 A1* | 3/2007 | Gueguen | 375/267 |
| 2008/0123547 A1 | 5/2008 | Palanki | |
| 2010/0040162 A1* | 2/2010 | Suehiro | 375/260 |
| 2011/0080969 A1* | 4/2011 | Jongren et al. | 375/267 |
| 2011/0085610 A1* | 4/2011 | Zhuang et al. | 375/260 |
| 2011/0150052 A1* | 6/2011 | Erell et al. | 375/219 |
| 2011/0170638 A1* | 7/2011 | Yuan et al. | 375/340 |
| 2012/0300867 A1* | 11/2012 | Chen et al. | 375/267 |

* cited by examiner

METHOD FOR ESTIMATING A RADIO CHANNEL

This invention relates to a method for estimating a radio propagation channel between an emitter and a receiver. It also relates to corresponding reception equipment and a computer program.

The invention particularly relates to multicarrier transmission systems, for example of the OFDM (Orthogonal Frequency Division Multiplexing) type.

This type of transmission is used increasingly frequently. It has particularly been adopted in LTE (Long Term Evolution), TEDS (TETRA Enhanced Data Service), DAB (Digital Audio Broadcasting) and DVB-T (Digital Video Broadcasting-Terrestrial) systems.

In OFDM transmission systems, data are generally organised in frames. In each frame, some symbols distributed in the time-frequency plane are inserted among the useful information intended for the receiver. These symbols, called "pilot symbols" are known to the emitter and the receiver. They are used for synchronising and estimating the propagation channel.

A propagation channel is defined as the path taken by a signal emitted by an emitter to a receiver. The channel includes a plurality of journeys between the emitter and the receiver, each journey being particularly characterised by a delay and an attenuation. The effect of that multi-journey channel, in the case of a channel that is not frequency selective, on a data symbol emitted is generally modelled simply by a complex multiplying coefficient that the receiver attempts to estimate in order to recover the emitted symbol with the fewest possible errors. Channel estimation is defined as the determination of these coefficients for all the symbols emitted.

Conventionally, the receiver begins by estimating the channel in the position of the pilot symbols, then it carries out a time and frequency interpolation in order to estimate the channel over the whole frame. The estimated channel is generally modelled by a column vector, called a channel vector, with a number of lines equal to the number of symbols in a frame.

However, such channel estimation is not optimal because it is very sensitive to channel variations and does not make it possible to effectively reduce noise-related effects.

The document FR2814011 describes a channel estimation method that does not have the drawbacks of conventional methods. However, the method described is very constraining in terms of complexity.

This invention aims to improve the situation.

To that end, the invention firstly concerns a method for the estimation of a radio propagation channel between an emitter and a receiver, where the said emitter emits a signal comprising symbol frames distributed in time and frequency, among which some symbols, called pilot symbols, are known to the receiver, characterised in that it comprises the following steps in the receiver:
computation of a covariance matrix $M_F$ of the channel in the frequency domain;
computation of a covariance matrix $M_T$ of the channel in the time domain;
decomposition of the covariance matrices $M_F$ and $M_T$ into eigenvectors according to the relations $M_F = W_F^H N_F W_F$ and $M_T = W_T^H N_T W_T$, in which:
$W_F$ is an eigenvector matrix of the matrix $M_F$;
$N_F$ is a diagonal matrix comprising eigenvalues associated with the eigenvectors of the matrix $M_F$;
$W_T$ is an eigenvector matrix of the matrix $M_T$;
$N_T$ is a diagonal matrix comprising eigenvalues associated with the eigenvectors of the matrix $M_T$;
computation of the Kronecker product of the eigenvector matrices $W_F$ and $W_T$ to obtain an overall eigenvector matrix W;
computation of a diagonal overall eigenvalue matrix N equal to the Kronecker product of the eigenvalue matrices $N_F$ and $N_T$; and
estimation of the propagation channel with the help of pilot symbols and eigenvector matrices W and eigenvalue matrices N using the maximum a posteriori or quadratic error minimisation criterion.

Pilot symbol means any symbol known to the receiver, that is both pilot symbols as designated in the standards of the known OFDM systems such as LTE and TEDS and/or synchronisation symbols and/or symbols that have already been demodulated and determined by the receiver in an earlier processing step.

This invention thus uses the property of the radio propagation channel which means that the constraints to be followed by the channel in the frequency domain are independent from the constraints to be followed in the time domain. That makes it possible to express the overall covariance matrix of the channel as the Kronecker product of the two covariance matrices $M_F$ and $M_T$, which are those of the frequency domain and the time domain respectively.

The Kronecker product of the two matrices A and B, the matrix A having the components $(a_{ij})$, where i is an integer between 1 and m and j is an integer between 1 and n, is the matrix product noted $A \otimes B$ and defined by the following expression:

$$A \otimes B = \begin{pmatrix} a_{11}B & \cdots & \cdots & a_{1n}B \\ \vdots & \cdots & \cdots & \vdots \\ a_{m1}B & \cdots & \cdots & a_{mn}B \end{pmatrix}.$$

The use of the separability of the covariance matrix according to the invention is very favourable in terms of complexity. Thus, for a frame of n symbols, with $n_f$ subcarriers and $n_t$ time symbols, the overall covariance matrix is of the dimension (n,n) with $n=n_f.n_t$. That matrix is equal to the Kronecker product of a covariance matrix $M_F$ of the dimension $(n_f,n_f)$ with a covariance matrix $M_T$ of the dimension $(n_t,n_t)$. Only $(n_f^2+n_t^2)$ values need to be memorised instead of $n_f^2.n_t^2$ values.

The eigenvector matrix W being the Kronecker product of the two eigenvector matrices $W_F$ and $W_T$, $(n_f.n_f+n_t.n_t)=n_f^2+n_t^2$ values are also sufficient to represent it. Further, the diagonal eigenvalue matrix N being the Kronecker product of the two diagonal matrices $N_F$ et $N_T$, only $n_f+n_t$ values are needed to represent it. The method of this invention thus makes it possible to significantly reduce the complexity of channel estimation, particularly in terms of the storage memory required.

In one embodiment, the criterion used is the maximum a posteriori criterion and the channel estimation step includes the following sub-steps:
computation of a matrix P according to the relation $P=\sqrt{N}.W.E^H.E.W^H.\sqrt{N}$ in which E is a diagonal matrix comprising pilot symbols at the positions of pilot symbols, the other elements of the diagonal being zero;
decomposition of the matrix P into eigenvectors according to the relation $P=X^H QX$ in which X is an eigenvector matrix of the matrix P and Q is a diagonal matrix comprising eigenvalues associated with the eigenvectors of the matrix P; and channel estimation according to the relation $C=W^H \cdot \sqrt{N} \cdot X^H \cdot (Q+\sigma^2 \cdot I)^{-1} \cdot X \cdot \sqrt{N} \cdot W \cdot E^H \cdot R$ in which C is a vector representing the channel, I is the identity matrix, R is a vector comprising the symbols received and $\sigma^2$ represents the power of the noise in the channel.

More precisely, the matrix $\sqrt{N}$ is a diagonal matrix where the terms of the diagonal are the square roots of the terms of the diagonal of the diagonal matrix N.

When the pilot symbols are evenly distributed in time and frequency, the matrix P may be written in the form of a Kronecker product of two matrices, relating to the frequency domain and the time domain respectively. In that case, channel estimation complexity is further reduced.

In one preferred embodiment, the channel estimation step includes the following sub-steps:

extraction of a matrix W' from the matrix W and a matrix N' from the matrix N, the matrix N' comprising a definite number n' of eigenvalues of the matrix N and the matrix W' comprising eigenvectors associated with these n' eigenvalues; and estimation of the propagation channel with the help of pilot symbols and eigenvector matrices W' and eigenvalue matrices N' using the maximum a posteriori or quadratic error minimisation criterion.

Preferentially, the n' eigenvalues are the largest eigenvalues of the matrix N.

That makes it possible to reduce the complexity of the channel estimation while minimising the loss of performance thanks to the fact that the eigenvectors retained in the matrix W' represent the largest part of the energy, represented by the sum of the eigenvalues retained in the matrix N'.

Advantageously, the n' eigenvectors of the matrix W' are the Kronecker products of a limited number $n'_f$ of eigenvectors of the matrix $W_T$ and a limited number $n'_t$ of eigenvectors of the matrix $W_T$ and the n' eigenvalues of the matrix N' are the products of the eigenvalues of the matrix $N_F$ corresponding with the $n'_f$ eigenvectors of the matrix $W_F$ and the eigenvalues of the matrix $N_T$ corresponding with the $n'_t$ eigenvectors of the matrix $W_T$.

In that case, the matrix W' is separable in time and frequency. Then $(n'_f . n_f + n'_t . n_t)$ values are sufficient for representing it. Thus, the complexity of the method is further reduced.

Preferentially, n' is less than or equal to the number of pilot symbols in each frame.

Advantageously, the criterion used is the maximum a posteriori criterion and the channel estimation step includes the following sub-steps:

computation of a matrix P' according to the relation $P' = \sqrt{N'} \cdot W' \cdot E^H \cdot E \cdot W'^H \cdot \sqrt{N'}$ in which E is a diagonal matrix comprising pilot symbols at the positions of pilot symbols, the other elements of the diagonal being zero;

decomposition of the matrix P' into eigenvectors according to the relation $P' = X'^H Q' X'$ in which X' is an eigenvector matrix of the matrix P' and Q' is a diagonal matrix comprising eigenvalues associated with the eigenvectors of the matrix P'; and channel estimation according to the relation $C = W'^H \cdot \sqrt{N'} \cdot X'^H \cdot (Q' + \Omega^2 \cdot I)^{-1} \cdot X' \cdot x\sqrt{N'} \cdot W' \cdot E^H \cdot R$ in which C is a vector representing the channel, I is the identity matrix, R is a vector comprising the symbols received and $\Omega^2$ represents the power of the noise in the channel.

More precisely, the matrix $\sqrt{N'}$ is a diagonal matrix where the terms of the diagonal are the square roots of the terms of the diagonal of the diagonal matrix N'.

When the pilot symbols are evenly distributed in time and frequency, the matrix P' may be written in the form of a Kronecker product of two matrices, relating to the frequency domain and the time domain respectively. In that case, channel estimation complexity is further reduced.

As an alternative, the criterion used is quadratic error minimisation and the channel is estimated according to the relation $C = W'^H \cdot \sqrt{N'} \cdot X'^H \cdot (Q' + \Omega^2 \cdot I)^{-1} \cdot X' x \sqrt{N'} \cdot W' \cdot E^H \cdot R$ in which C is a vector representing the channel, I is the identity matrix, R is a vector comprising the symbols received and $\Omega^2$ represents the power of the noise in the channel.

This alternative makes it possible to obtain results close to those obtained by applying the maximum a posteriori criterion. Its complexity is equivalent if the matrix W' is separable in time and frequency.

Advantageously, the signal is a multicarrier signal, particularly an OFDM signal.

The invention can also apply to single carrier systems.

The invention also concerns reception equipment capable of receiving a signal transmitted through a radio propagation channel, the said signal comprising symbol frames distributed in time and frequency, among which some symbols, called pilot symbols, are known to the said receiver, characterised in that it comprises the means for the following:

computation of a covariance matrix $M_F$ of the channel in the frequency domain;

computation of a covariance matrix $M_T$ of the channel in the time domain;

decomposition of the covariance matrices $M_F$ and $M_T$ into eigenvectors according to the relations $M_F = W_F^H N_F W_F$ and $M_T = W_T^H N_T W_T$, in which:

$W_F$ is an eigenvector matrix of the matrix $M_F$;

$N_F$ is a diagonal matrix comprising eigenvalues associated with the eigenvectors of the matrix $M_F$;

$W_T$ is an eigenvector matrix of the matrix $M_T$;

$N_T$ is a diagonal matrix comprising eigenvalues associated with the eigenvectors of the matrix $M_T$;

computation of the Kronecker product of the eigenvector matrices $W_F$ and $W_T$ to obtain an overall eigenvector matrix W;

computation of a diagonal overall eigenvalue matrix N equal to the Kronecker product of the eigenvalue matrices $N_F$ and $N_T$; and estimation of the propagation channel with the help of pilot symbols and eigenvector matrices W and eigenvalue matrices N using the maximum a posteriori or quadratic error minimisation criterion.

The invention also relates to a computer program comprising instructions for implementing the method according to the invention when the program is executed by at least one processor.

The charts in FIGS. 2 to 4 are schematic illustrations of the execution of the computer program in the preferred embodiments of the invention.

Embodiments of the invention will now be described in a more precise but non-limitative manner by reference to the drawings attached where:

FIG. 1 represents reception equipment 2 of an OFDM transmission system, such as for example a mobile terminal of a PMR (Professional Mobile Radio) system of the TEDS type.

Figure 1:
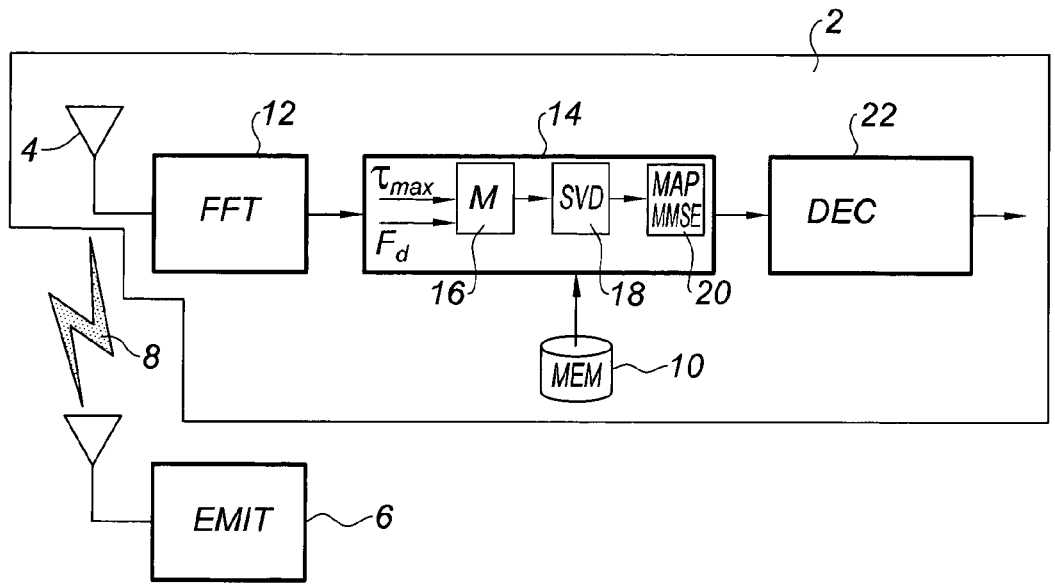
FIG. 1 is a diagram of reception equipment according to the invention.

The receiver 2 comprises an antenna 4 for the reception of an OFDM signal transmitted from an emitter 6 through a radio propagation channel 8.

The OFDM signal emitted by the emitter 6 is organized in frames of symbols distributed in time and frequency, among which some symbols, called pilot symbols, are known to the receiver 2 and are stored in a memory 10 of the said receiver 2. Each frame thus comprises n symbol with $n_f$ subcarriers and $n_t$ time symbols, n being equal to the product of $n_f$ and $n_t$.

The receiver 2 comprises means 12 for the time frequency conversion of the signal received to convert it from the time domain to the frequency domain. Those time frequency conversion means 12 use a Fast Fourier Transform.

The receiver 2 also comprises a channel estimation module 14 using pilot symbols stored in the memory 10 and its knowledge of the physical constraints of the channel 8 in the time and frequency domains to estimate the propagation channel 8.

Firstly, in the frequency domain, the frequency spread of the channel 8, called the Doppler spread, due to reflections off near obstacles is limited. The spread ranges between $-F_D$ and $+F_D$, where $F_D$ is the maximum Doppler frequency given by the relation $$F_D = \frac{v}{c} \cdot F_P,$$

in which v is the speed of the receiver 2, c is the speed of light and $F_p$ is the carrier frequency. The components of the frequency spectrum of the propagation channel 8 along the frequency axis thus lie between these limits $-F_D$ and $+F_D$.

Secondly, the time spread of the channel 8 due to reflections off far obstacles is limited. That time spread depends on the frequency band used and the environment. For example, at a carrier frequency of 400 MHz in an urban environment, the time spread is of the order of 5 μs whereas in a mountainous environment, the spread is of the order of 15 μs. The components of the time response of channel 8 are thus located between fixed limits for given environmental conditions.

The limits of the frequency spectrum and the time response of the channel 8 are known to the receiver 2 and are stored in the memory 10.

The channel estimation module 14 comprises means 16 for computing covariance matrices $M_F$ and $M_T$ of the channel in the frequency domain and in the time domain respectively, from the limits of the time spread and frequency spread respectively stored in memory 10.

The channel estimation module 14 also comprises means 18 for decomposing the covariance matrices $M_F$ and $M_T$ into eigenvectors and eigenvalues. These means are capable of computing an overall covariance matrix M of the channel from the matrices $M_F$ and $M_T$.

The channel estimation module 14 further comprises means 20 for the estimation of the propagation channel with the help of the pilot symbols stored in the memory 10 and the eigenvectors and eigenvalues obtained by the decomposition means 18 using the maximum a posteriori or quadratic error minimisation criterion.

The receiver 2 also comprises a decoder 22 providing an estimation of the symbols emitted from the channel estimation by the channel estimation module 14.

The structure of the receiver in the invention has now been described, and the working of the channel estimation method used in the channel estimation module 14 will be detailed.

In general, the signal received by the receiver 2 is written in the form R=E.C+B where R is a vector of the dimension n made up of the symbols received, C is a vector of the dimension n representing the propagation channel 8 of the dimension n, E is a diagonal matrix of the dimension (n,n) made up of the symbols emitted in a frame and B is a vector of the dimension n representing the noise of channel 8.

Conventionally, it is considered that the noise of the channel is a Gaussian variance noise, or power, $\Omega^2$. The probability of receiving the vector R knowing the vector C is then equal to $$e^{-\frac{\|R-EC\|^2}{2\sigma^2}}.$$

Further, for a land mobile radio channel varying according to the Rayleigh law, the probability that the channel is equal to $$e^{-\frac{C^H \cdot M^{-1} \cdot C}{2}}$$

where M is the covariance matrix of the channel and where the notation $X^H$ indicates that it is a conjugate transpose matrix X.

As regards the choice of $\Omega^2$ and M, it must be noted that the standardised channel covariance matrix may be taken for M, that is the unit mean power channel. In that case, $\Omega^2$ then represents the reverse of the signal to noise ratio. A target signal to noise ratio may be fixed, which value does not change regardless of the effective value of the noise power and the useful signal power. Other solutions are possible, such as estimating the signal to noise ratio as the information is received and demodulated, for example with pilot symbols that are known to the emitter and the receiver; in that case, the signal to noise ratio can be adapted dynamically in the channel estimation process.

Figure 2:
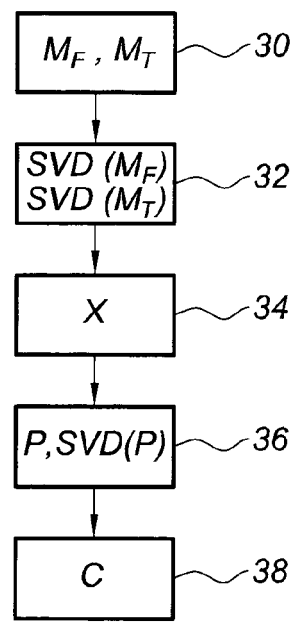
FIG. 2 is a chart illustrating the working of the channel estimation method according to a first embodiment of the invention.

The chart in FIG. 2 illustrates a first embodiment of the channel estimation method of the invention, using the maximum a posteriori or MAP criterion.

The resolution of the channel estimation problem in the meaning of MAP amounts to maximising the probability that the channel is equal to C, knowing the vector R, while addressing its physical constraints expressed in the covariance matrix M.

That amounts to maximising the probability $$e^{-\frac{\|R-EC\|^2}{2\sigma^2}} \cdot e^{-\frac{C^H \cdot M^{-1} \cdot C}{2}},$$

which amounts to minimising the opposite of the logarithm of that expression equal to $$e^{-\frac{\|R-EC\|^2}{2\sigma^2}} + C^H \cdot M^{-1} \cdot C.$$

The solution C is thus that for which the following expression, noted [1], obtained by cancelling the gradient compared to C of the previous expression, is verified:

$$(E^H.H+\Omega^2.M^{-1})C=E^H.R \qquad [1]$$

Only the pilot symbols are known to the receiver 2, so zeros are placed in the matrix E at the locations of the other symbols unknown to the receiver.

But the constraints of the channel 8 in the time domain are independent of its constraints in the frequency domain. The covariance matrix M of the channel is thus separable in time and frequency. This invention takes advantage of such separability of the covariance matrix M by expressing it as the Kronecker product of two covariance matrices $M_F$ and $M_T$, the matrix $M_F$ expressing the constraints of the channel in the frequency domain and the matrix $M_T$ expressing the constrains of the channel in the time domain.

Thus, in step 30, the covariance matrices $M_F$ and $M_T$ of the channel in the frequency domain and the time domain respectively are computed conventionally by the computation means 16 by using the time spread and Doppler spread limits respectively of the channel 8 stored in the memory 10. The matrices $M_F$ and $M_T$ are stored in the memory 10.

In step 32, the covariance matrices $M_F$ and $M_T$ are decomposed into eigenvectors and eigenvalues by the decomposition means 18 according to the relations $M_F=W_F^H N_F W_F$ and $M_T=W_T^H N_T W_T$, where:

$W_F$ is an eigenvector matrix of the matrix $M_F$;

$N_F$ is a diagonal matrix comprising eigenvalues associated with the eigenvectors of the matrix $M_F$;

$W_T$ is an eigenvector matrix of the matrix $M_T$; and $N_T$ is a diagonal matrix comprising eigenvalues associated with the eigenvectors of the matrix $M_T$.

In step 34, the decomposition means 18 compute the Kronecker product of the eigenvector matrices $W_F$ and $W_T$ to obtain an overall eigenvector matrix W of the dimension (n, n). They also compute a diagonal overall eigenvalue matrix N of the dimension (n, n) containing the products of the eigenvalues of the matrices $N_F$ and $N_T$. The matrices $W_F$, $N_F$, $W_T$ and $N_T$ are also stored in the memory 10.

The covariance matrix M of the channel 8 is then equal to $M=W^H NW$.

The expression [1] may thus be written: $(E^H E+\Omega^2.W^H.N^{-1}.W)C=E^H.R$.

By stating $C=W^H.\sqrt{N}.b$ where b is a vector of the dimension n, and where $\sqrt{N}$ is a diagonal matrix where each term of the diagonal is the square root of the corresponding term of the diagonal of the diagonal matrix N, the expression [1] is written:

$$(\sqrt{N}.W.E^H.E.W^H.\sqrt{N}+\Omega^2.I)b=\sqrt{N}.W.E^H.R \qquad [2]$$

where I is the identity matrix.

In step 36, the channel estimation means 20 compute the matrix $P=\sqrt{N}.W.E^H.E.W^H.\sqrt{N}$ and decompose that matrix P into eigenvectors and eigenvalues according to the relation $P=X^H Q X$ in which X is an eigenvector matrix of the matrix P and Q is a diagonal matrix comprising eigenvalues associated with the eigenvectors of the matrix P.

In step 38, the channel estimation means 20 estimate the channel 8 from the relation 2 according to the following expression [3]:

$$C=W^H.\sqrt{N}.X^H.(Q+\Omega^2.I)^{-1}.X.\sqrt{N}.W.E^H.R \qquad [3]$$

Figure 3:
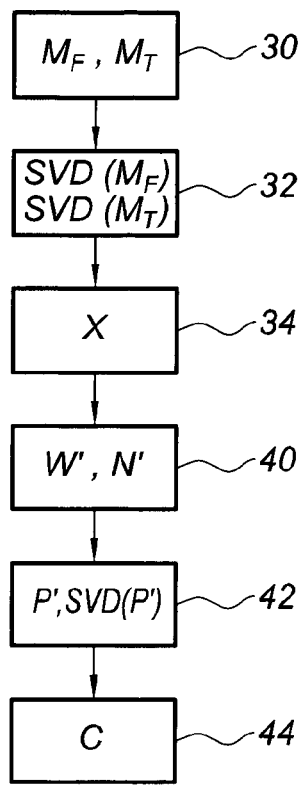
FIG. 3 is a chart illustrating the working of the channel estimation method according to a second embodiment of the invention.

The chart in FIG. 3 illustrates a second embodiment of the channel estimation method of the invention, also using the MAP criterion. In that figure, steps 30 to 34 are identical to those of FIG. 2. The description of the steps is thus not repeated. In step 40, the channel estimation means 20 extract a diagonal matrix N' from the matrix N, the matrix N' comprising a definite number n' of the largest eigenvalues of N and determine a matrix W' comprising the eigenvectors associated with these n' largest eigenvalues. The matrices N' and W' are stored in the memory 10.

Generally, the eigenvalues of the matrix N decrease rapidly. Thus, the sum of eigenvalues stored in the matrix N' accounts for a large part of the energy of the channel 8. The matrix W' thus comprises the most representative eigenvectors to express the constraints of the channel.

The expression [1] may thus be written: $(E^H E+\Omega^2.W'^H.N'^{-1}.W')C=E^H.R$.

By stating $C=W'^H.\sqrt{N'}.b$ where b is a vector of the dimension n', the expression [1] is written $$(\sqrt{N'}.W'.E^H.E.W'^H.\sqrt{N'}+\Omega^2.I).b=\sqrt{N'}.W'.E^H.R \qquad [4]$$

where I is the identity matrix.

In step 42, the channel estimation means 20 compute a matrix P' according to the relation $P'=\sqrt{N'}.W'.E^H.E.W'^H.\sqrt{N'}$ and decompose the matrix P' into eigenvectors and eigenvalues according to the relation $P'=X'^H Q' X'$ in which X' is an eigenvector matrix of the matrix P' and Q' is a diagonal matrix comprising eigenvalues associated with the eigenvectors of the matrix P'.

In step 44, the channel estimation means 20 estimate the channel 8 from the relation [4] according to the following expression [5]:

$$C=W'^H.\sqrt{N'}.X'^H.(Q'+\Omega^2.I)^{-1}.X'.\sqrt{N'}.W'.E^H.R \qquad [5]$$

The matrix W' being of the dimension (n',n) and the matrix N' being of the dimension (n',n'), this embodiment allows less complex computations than the first embodiment.

In a preferential embodiment, the n' eigenvectors of the matrix W' are the Kronecker products of a limited number $n'_f$ of eigenvectors of the matrix $W_F$ and a limited number $n'_t$ of eigenvectors of the matrix $W_T$ and the n' eigenvalues of the matrix N' are the products of the eigenvalues of the matrix $N_F$ corresponding with the $n'_f$ eigenvectors of the matrix $W_F$ and the eigenvalues of the matrix $N_T$ corresponding with the $n'_t$ eigenvectors of the matrix $W_T$. In that case, the matrix W' is separable in time and frequency. It can then be stored in the form of the Kronecker product of 2 matrices and then it is a total dimension of $[(n'_f n_f)+(n'_t n_t)]$, which makes it possible to reduce the complexity of the method.

Figure 4:
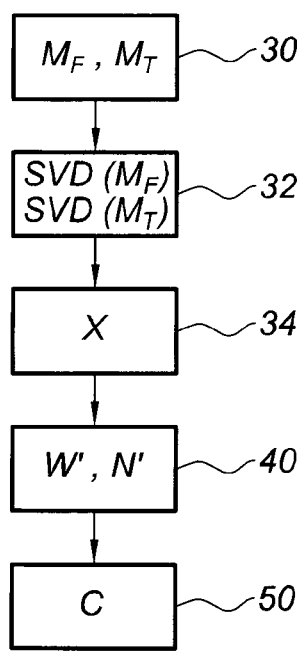
FIG. 4 is a chart illustrating the working of the channel estimation method according to a third embodiment of the invention.

The chart in FIG. 4 illustrates a third embodiment of the channel estimation method of the invention, using the quadratic error minimisation criterion.

According to that embodiment, the quadratic error $\|R-EC\|^2$ is minimised by making it necessary for the channel to be a linear combination of a limited number of eigenvectors of the covariance matrix M.

In that case, the matrices W' and N' are thus used as determined in step 40 of the second embodiment.

Thus, in that figure, steps 30 to 40 are identical to those of FIG. 3. The description of the steps is thus not repeated.

In step 50, the channel estimation means 20 estimate the channel 8 according to the relation $$C=W'^H.N'.(N'+\Omega^2.I)^{-1}.(W'E^H.E.W'^H)^{-1}W'.E^H.R \qquad [6]$$

where the notation $X^H$ indicates that it is a conjugate transpose matrix X.

This expression makes it possible to obtain results close to those of expression [5] of the second embodiment.

When the matrix w' is separable in time and frequency, the complexity of that embodiment is equivalent to that of the second embodiment.

Of course, other embodiments may also be envisaged.

More particularly, the covariance matrices may be computed dynamically in order to take account of the variations of the constraints of the channel.

It is also possible to take account of other parameters while computing the covariance matrices, particularly delay profiles etc.

The invention claimed is:

1. A method for the estimation of a radio propagation channel between an emitter and a receiver where the said emitter emits a signal comprising symbol frames distributed in time and frequency, among which some symbols, called pilot symbols, are known to the receiver, wherein the method comprises the following steps performed by the receiver:

computation of a covariance matrix $M_F$ of the channel in the frequency domain;

computation of a covariance matrix $M_T$ of the channel in the time domain;

decomposition of covariance matrices $M_F$ and $M_T$ into eigenvectors according to the relations $M_F = W_F^H N_F W_F$ and $M_T = W_T^H N_T W_T$, in which:

$W_F$ is an eigenvector matrix of the matrix $M_F$;

$N_F$ is a diagonal matrix comprising eigenvalues associated with the eigenvectors of the matrix $M_F$;

$W_T$ is an eigenvector matrix of the matrix $M_T$;

$N_T$ is a diagonal matrix comprising eigenvalues associated with the eigenvectors of the matrix $M_T$;

computation of the Kronecker product of the eigenvector matrices $W_F$ and $W_T$ to obtain an overall eigenvector matrix W;

computation of a diagonal overall eigenvalue matrix N equal to the Kronecker product of the eigenvalue matrices $N_F$ and $N_T$; and estimation of the propagation channel with the help of pilot symbols and eigenvector matrices W and eigenvalue matrices N using the maximum a posteriori or quadratic error minimisation criterion.

2. A method according to claim 1, in which the criterion used is the maximum a posteriori criterion and the channel estimation step includes the following sub-steps:

computation of a matrix P according to the relation $P = \sqrt{N}.W.E^H.E.W^H.\sqrt{N}$ in which E is a diagonal matrix comprising pilot symbols at the positions of pilot symbols, the other elements of the diagonal being zero;

decomposition of the matrix P into eigenvectors according to the relation $P = X^H Q X$ in which X is an eigenvector matrix of the matrix P and Q is a diagonal matrix comprising eigenvalues associated with the eigenvectors of the matrix P; and estimation of the channel according to the relation $C = W^H . \sqrt{N}.X^H.(Q+\sigma^2.I)^{-1}.X.\sqrt{N}.W.E^H.R$ in which C is a vector representing the channel, I is the identity matrix, R is a vector comprising the symbols received and $\sigma^2$ represents the power of the noise in the channel.

3. A method according to claim 1, in which the channel estimation step includes the following sub-steps:

extraction of a matrix W' from the matrix W and a matrix N' from the matrix N, the matrix N' comprising a definite number n' of eigenvalues of the matrix N and the matrix W' comprising eigenvectors associated with these n' eigenvalues; and estimation of the propagation channel with the help of pilot symbols and eigenvector matrices W' and eigenvalue matrices N' using the maximum a posteriori or quadratic error minimisation criterion.

4. A method according to claim 3 in which the n' eigenvalues are the largest eigenvalues of the matrix N.

5. A method according to claim 3 in which the n' eigenvectors of the matrix W' are the Kronecker products of a limited number $n'_f$ of eigenvectors of the matrix $W_F$ and a limited number $n'_t$ of eigenvectors of the matrix $W_T$ and the n' eigenvalues of the matrix N' are the products of the eigenvalues of the matrix $N_F$ corresponding with the $n'_f$ eigenvectors of the matrix $W_F$ and the eigenvalues of the matrix $N_T$ corresponding with the $n'_t$ eigenvectors of the matrix $W_T$.

6. A method according to claim 3, in which n' is less than or equal to the number of pilot symbols in each frame.

7. A method according to claim 3, in which the criterion used is the maximum a posteriori criterion and the channel estimation step includes the following sub-steps:

computation of a matrix P' according to the relation $P' = \sqrt{N'}.W'.E^H.E.W'^H.\sqrt{N'}$ in which E is a diagonal matrix comprising pilot symbols at the positions of pilot symbols, the other elements of the diagonal being zero;

decomposition of the matrix P' into eigenvectors according to the relation $P' = X'^H Q' X'$ in which X' is an eigenvector matrix of the matrix P' and Q' is a diagonal matrix comprising eigenvalues associated with the eigenvectors of the matrix P'; and channel estimation according to the relation $C = W'^H . \sqrt{N'}.X'^H.(Q'+\sigma^2.I)^{-1}.X'\sqrt{N'}.W'.E^H.R$ in which C is a vector representing the channel, I is the identity matrix, R is a vector comprising the symbols received and $\sigma^2$ represents the power of the noise in the channel.

8. A method according to claim 6, in which the criterion used is quadratic error minimisation and the channel is estimated according to the relation $C = W'^H.N'.(N'+\sigma^2.I)^{-1}.(W'.E^H.E.W'^H)^{-1}W'.E^H.R$ in which C is a vector representing the channel, I is the identity matrix, R is a vector comprising the symbols received and $\sigma^2$ represents the power of the noise in the channel.

9. A method according to claim 1, in which the signal is a multicarrier signal, particularly an OFDM signal.

10. Reception equipment capable of receiving a signal transmitted through a radio propagation channel, the said signal comprising symbol frames distributed in time and frequency, among which some symbols, called pilot symbols, are known to the receiver, wherein the equipment comprises means for the following:

computation of a covariance matrix $M_F$ of the channel in the frequency domain;

computation of a covariance matrix $M_T$ of the channel in the time domain;

decomposition of covariance matrices $M_F$ and $M_T$ into eigenvectors according to the relations $M_F = W_F^H N_F W_F$ and $M_T = W_T^H N_T W_T$, in which:

$W_F$ is an eigenvector matrix of the matrix $M_F$;

$N_F$ is a diagonal matrix comprising eigenvalues associated with the eigenvectors of the matrix $M_F$;

$W_T$ is an eigenvector matrix of the matrix $M_T$;

$N_T$ is a diagonal matrix comprising eigenvalues associated with the eigenvectors of the matrix $M_T$;

computation of the Kronecker product of the eigenvector matrices $W_F$ and $W_T$ to obtain an overall eigenvector matrix W;

computation of a diagonal overall eigenvalue matrix N equal to the Kronecker product of the eigenvalue matrices $N_F$ and $N_T$; and estimation of the propagation channel with the help of pilot symbols and eigenvector matrices W and eigenvalue matrices N using the maximum a posteriori or quadratic error minimisation criterion.

11. A computer program comprising instructions for implementing the method according to claim 1 when the program is executed by at least one processor.

\* \* \* \* \*